United States Patent [19]
Rencin et al.

[11] 3,743,065
[45] July 3, 1973

[54] PAWL CLUTCH

[75] Inventors: Miloslav Rencín; Miloš Mládek; Ladislav Bureš, all of Usti Nad Orlici, Czechoslovakia

[73] Assignee: Elitex Zavody Textilniho Strojirenstvi, Liberec, Czechoslovakia

[22] Filed: Dec. 13, 1971

[21] Appl. No.: 207,073

[30] Foreign Application Priority Data
Dec. 14, 1970 Czechoslovakia............. 839470

[52] U.S. Cl............. 192/20, 192/46, 192/47, 192/67 R
[51] Int. Cl............. F16d 41/12, F16d 11/04
[58] Field of Search............. 192/20, 46, 47, 67 R

[56] References Cited
UNITED STATES PATENTS

| 813,869 | 2/1906 | Deiller | 192/67 R |
|---|---|---|---|
| 1,798,047 | 3/1931 | Ubrich | 192/67 R |
| 433,968 | 8/1890 | Unzicker | 192/67 R |
| 2,479,946 | 8/1949 | Lofgren | 192/46 X |
| 1,062,840 | 5/1913 | Miller | 192/20 |

FOREIGN PATENTS OR APPLICATIONS

| 921,536 | 1/1947 | France | 192/67 R |
|---|---|---|---|
| 1,052,495 | 9/1953 | France | 192/67 R |
| 48,236 | 8/1913 | Sweden | 192/46 |

*Primary Examiner*—Allan D. Herrmann
*Attorney*—Michael S. Striker

[57] ABSTRACT

A clutch, particularly for use in spinning machines, has an outer drive part mounted for rotation on the hollow shaft of an inner driven part. The shaft supports a set of angularly spaced radial holders supporting groups of coupling pawls for angular movement to and from a coupling position engaging an annular inner gear of the drive part for coupling the drive part with the driven part. An actuating rod in the interior of the hollow shaft, moves all coupling pawls out of the coupling position into which the coupling pawls are urged by springs. Preferably, a group of thin coupling pawls cooperates with each tooth of the annular inner gear of the drive part so that the clutch engages after a relative displacement between the drive part and the driven part not greater than the thickness of a pawl.

9 Claims, 3 Drawing Figures

PATENTED JUL 3 1973 3,743,065

PAWL CLUTCH

BACKGROUND OF THE INVENTION

Conventional clutches transmit rotary motion by friction discs or gear trains, and have the disadvantage that slipping occurs between friction discs or interengaging gears or coupling fingers so that the engagement of the clutch is delayed. This is particularly undesirable for use of a clutch controlling the feeding of fibrous material into the fiber separating mechanism of a spinning machine. If the feeding of the fibrous material is delayed, trouble occurs when the yarns are pieced together, which operation may have to be repeated several times before the end of a broken yarn is again connected to the fibers deposited on the annular collecting surface of a spinning means, which have to be wrapped about the yarn end in the form of a newly constituted yarn.

SUMMARY OF THE INVENTION

It is one object of the invention to overcome the slow and delayed engagement of conventional clutches, and to provide a clutch which quickly engages and disengages.

Another object of the invention is to provide a quickly engaging clutch particularly suited for a spinning machine.

With these objects in view, an embodiment of the invention comprises a rotary drive part and a rotary driven part having a common axis. One of the parts, preferably the drive part, has an annular inner toothing and surrounds the other part, preferably the driven part, which includes a hollow shaft, holder means, and coupling pawl means mounted on the holder means for movement between a coupling position engaging the annular inner toothing for connecting the drive part with the driven part, and a disengaged position spaced from the annular inner toothing. Spring means are mounted on the other part, preferably on the driven part, and abutting the pawl means for urging the pawl means to the coupling position; and actuating means, preferably including an actuating rod movable in the interior of the hollow shaft of the driven part between an inoperative position, and an operative position for moving the pawl means against the action of the spring means to the disengaged position.

In the preferred embodiment, a set of holder means, for example three holder means angularly spaced about the hollow shaft, supports the coupling pawl means for pivotal movement.

It is particularly advantageous, if each coupling pawl means is constituted by a group of adjacent thin coupling pawls mounted on the same pivot of the respective holder, and cooperating with individual springs so as to be urged individually into engagement with the teeth and recesses of the inner toothing. This embodiment has the advantage that the angular relative displacement between the drive part and the driven part is not greater than the thickness of one coupling pawl before one of the respective group of coupling pawls engages a tooth of the toothing.

The annular inner toothing includes alternate teeth and recesses circumferentially spaced a pitch distance substantially equal to the combined thickness of all the adjacent coupling pawls of a group.

Preferably, the coupling pawls have slanted engagement faces parallel with the front and rear faces, respectively of the teeth of the annular inner toothing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
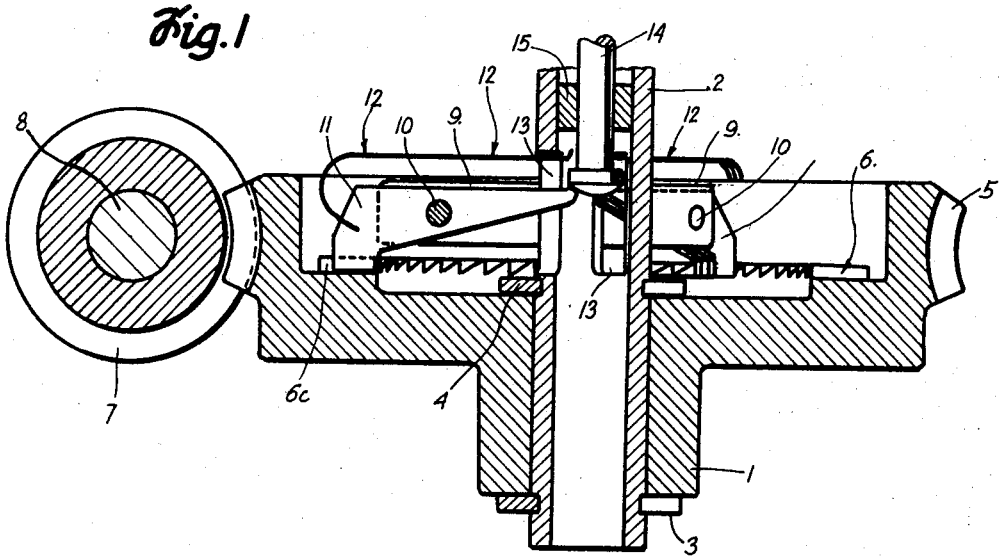
FIG. 1 is a fragmentary axial sectional view illustrating an embodiment of the invention.

Only one clutch is shown in the drawing, but in a spinning machine in which a plurality of spinning units is provided, each spinning unit cooperates with a clutch according to the invention.

Figure 2:
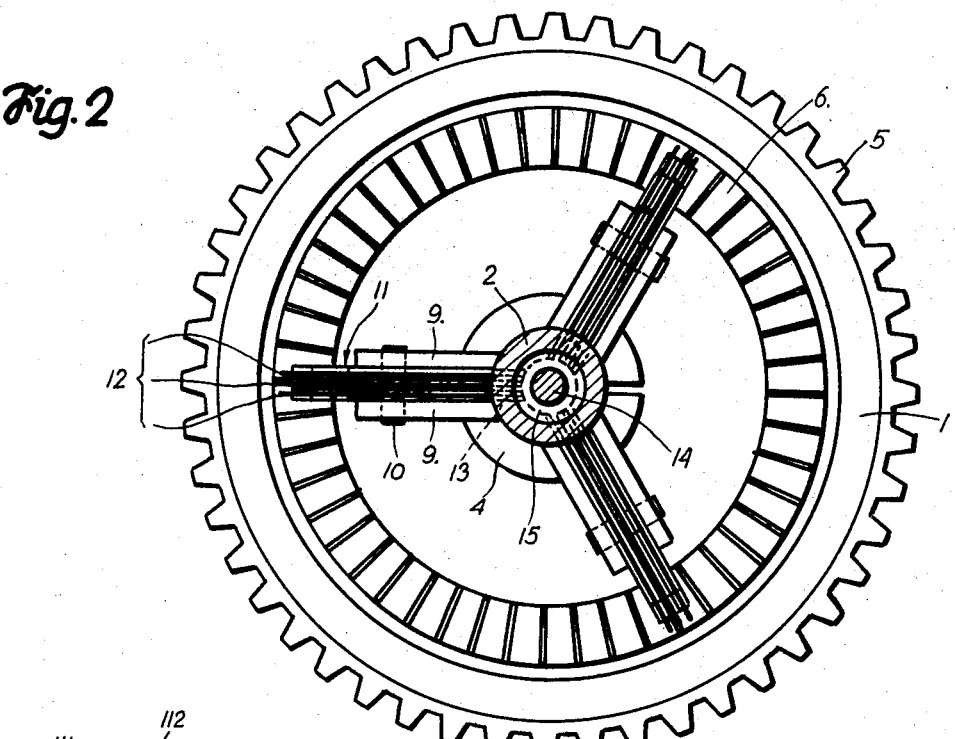
FIG. 2 is a plan view, partially in horizontal section, of the embodiment of FIG. 1.

As shown in FIGS. 1 and 2, the rotary drive part 1 is mounted for rotation on a hollow shaft 2 mounted in bearings, not shown, of a spinning unit, at one end, and having at the other end, a mechanism for feeding fibrous material, such as a roller, not shown. The annular drive part 1 is prevented from axial movement along the hollow shaft 2, by spring rings 3 and 4 which are secured to shaft 2. Drive part 1 has an outer gear ring 5, and an annular inner toothing 6 located in a plane perpendicular to the common axis of shaft 2 and drive part 1.

A drive shaft 8 has a peripheral worm screw meshing with worm gear ring 5 on the outside of drive part 1, so that drive part 1 rotates when shaft 8 with worm screw 7 rotates.

The hollow shaft 2 has circumferentially spaced openings 13, and three rigid holder means 9 angularly spaced about hollow shaft 2, and projecting from the same in radial direction. Each holder means 9 includes two parallel arms supporting at the outer end, a pivot pin 10. As best seen in FIG. 2, the two arms of each holder means 9 are located on opposite sides of an opening 13 in shaft 2.

A pawl means 11 is mounted on each pivot 10 for angular movement, and forms a double armed lever whose inner end projects through the respective opening 13 into the interior of the hollow shaft 2, while its outer end cooperates with the inner annular toothing 6 of the drive part 1. Leaf spring means 12 have inner ends secured in the openings 13 of the hollow shaft 2, respectively, and outer ends resiliently bent to engage and abut the respective pawl means 11 to urge the same to turn about the respective pivot 10 to a coupling position engaging the teeth and recesses of the inner annular toothing 6. The actuating rod 14 is mounted in a bearing 15 in hollow shaft 2, and is movable in axial direction between an inoperative position, and a position in which a head portion of actuating rod 14 engages the inner ends of the pawl means 11 so that downward movement of actuating rod 14, as viewed in FIG. 1, will cause turning of all pawl means 11 to a disengaged position in which the outer ends of pawl means 11 are spaced from the annular inner toothing 6.

From the above description, it will become apparent that hollow shaft 2, the three holder means 9, the springs 12, and the coupling means 11 together constitute the driven part of the clutch which is engaged when the outer end of pawl means 11 engage the annular inner toothing 6, and disengaged when, by operation of the actuating rod 14, the pawl means 11 are turned to a position spaced from annular inner toothing 6.

The engagement of the clutch is effected by moving actuating bar 14 upward as viewed in FIG. 1, so that springs 12 can turn pawl means 11 to the coupling position, while the disengagement of the clutch is effected by moving actuating rod 14 downwardly as viewed in FIG. 1, so that the pawl means 11 are turned in the opposite direction and release the annular inner toothing 6.

FIG. 2 shows the outer gear ring 5 and the annular inner toothing 6 provided with teeth and recesses around the entire outer gear ring 5 and annular inner toothing 6.

Figure 3:
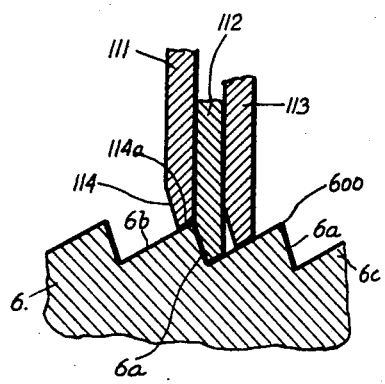
FIG. 3 is a fragmentary developed view illustrating a detail of the preferred embodiment of the invention.

As best seen in FIGS. 2 and 3, each coupling pawl means 11 is shown to be a group of three adjacent coupling pawls mounted on a common pivot 10 of the holder means 9. It is possible to interconnect the three coupling pawls 111, 112, 113 for movement together about pivot 10, but in the preferred embodiment of the invention, each coupling pawl 111, 112, 113 is independently turnable on the respective pivot 10 on which the respective group of coupling pawls 111, 112, 113 is mounted. Accordingly, an individual leaf spring 12, shaped and mounted as shown in FIG. 1, is provided for each coupling pawl 111, 112 and 113 and urges the same to move to the coupling position in which its outer end engages the annular inner toothing 6 of the drive part 1.

As shown in FIG. 3, the annular inner toothing 6 has ratchet teeth with a steep front face and a sloping rear face. The three coupling pawls 111, 112 and 113 are identical, and each coupling pawl has a first engagement face 114, and a second engagement face 114a. The slant of the engagement face 114 corresponds to the steep slant of the front face 6a, and the slant of the other engagement face 114a corresponds to the slant of the rear face 6b of a tooth 6c.

Assuming that the drive part 1 is turned by drive shaft 8 while the clutch is disengaged, and the clutch is operated by retracting actuating rod 14 so that all three groups of coupling pawls 111, 112, 113 turn toward the teeth 6c of the annular inner toothing 6, the engaging face 114 of the coupling pawl 112 which is closest to the point 600 of the tooth 6c, will be urged by the associated spring 12 into the recess between two teeth 6c, and abut the steep face 6a of the respective tooth, while another pawl 111 may engage with its engagement face 114a the sloping rear face 6b of a tooth, and engaging face 114a of another pawl 113 may abut the sloping rear face 6b of another tooth 6c, as shown in FIG. 3.

However, it will be understood that, depending on the relative position between the drive part 1 and the driven part 2, 9, 11, 10, 12, 13, any one of the outer coupling pawls 111 or 113 may abut the steep face 6a of the respective tooth. Consequently, considering that the pitch between two teeth 6c is substantially equal to the combined thickness of all three coupling pawls 111, 112, 113, the angular relative displacement between the drive part and the driven part is not greater than the thickness of one coupling pawl before one of the coupling pawls 111, 112, 113 engages a tooth 6c of the annular inner toothing 6. As a result, the clutch will very rapidly engage, faster than in an arrangement in which the three coupling pawls 111, 112, 113 form a unit for movement together. Only a minimum delay takes place upon operation of the actuating rod 14 which permits springs 12 to move the three groups of three coupling pawls 11 to the coupling position. Consequently, assuming that a roller for feeding fibrous material to a spinning machine is driven by shaft 2, after an interruption, the feeding of fibrous material into the fiber separating mechanism of the spinning machine will almost immediately take place upon operation of the actuating rod 14.

The feeding roller will be driven as long as the clutch is engaged due to retraction of the actuating rod 14 and engagement of the annular inner toothing 6 by the pawl means 11. In the event that the feeding of fibrous material is to be interrupted, the actuating rod 14 is moved deeper into the hollow shaft 2, for example by an electromagnet, not shown, whose armature is connected with the actuating rod 14, so that the inner ends of pawl means 11, or of pawls 111, 112, 113 are downwardly moved as viewed in FIG. 1 whereby the outer end portions of the coupling pawls 111, 112, 113 are retracted from the engaged teeth of the annular inner toothing 6 and the clutch is disengaged. As soon as the electromagnet, not shown, is de-energized, the force of the springs 12 urges the outer ends of the coupling pawls downward, and the inner ends upward so that the clutch is again engaged, and hollow shaft 2 driven from drive part 1 by means of the three groups of coupling pawls 111, 112, 113, and the three holder means 9. As noted above, in the engaged position of the drive part and driven parts of the clutch, feeding of fibrous material into the fiber separating mechanism takes place.

It will be understood that each of the elements described above, or two or more together, may also find a useful application in other types of pawl clutches, differing from the types described above.

While the invention has been illustrated and described as embodied in a pawl clutch including a set of groups of narrow coupling pawls mounted on an inner driven part of the clutch, and operable to engage teeth and recesses of a drive part surrounding the driven part, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Pawl clutch comprising a rotary drive part and a rotary driven part having a common axis, one of said parts surrounding the other part and having an annular inner toothing, and the other part including holder means including pivot means, and coupling pawl means including a group of coupling pawls mounted adjacent each other on said pivot means for independent angular movement toward and away from said annular inner toothing, said coupling pawls being movable between a coupling position engaging said annular inner toothing for connecting said drive part with said driven part so that said clutch is engaged, and a disengaged position spaced from said annular inner toothing so that said clutch is disengaged; spring means mounted on said other part and including a plurality of springs abutting said coupling pawls, respectively, for urging said coupling pawls individually toward said annular inner toothing and to said coupling position; and actuating means movable between an operative position for moving said pawls against the action of said springs to said disengaged position, and an inoperative position releasing said coupling pawls for movement by said springs toward said annular inner toothing, whereby the relative angular displacement between said drive part and said driven part is not greater than the thickness of one coupling pawl before one of said coupling pawls engages a tooth of said toothing.

2. A clutch as claimed in claim 1 wherein said coupling pawls are double-armed pawls having one end for engaging said annular inner toothing and an other end cooperating with said actuating means, and being supported by said pivot means between said ends thereof.

3. A clutch as claimed in claim 1 wherein said other part includes a hollow shaft having at least one opening through which said other ends of said pawls project into the interior of said hollow shaft; and wherein said actuating means includes an actuating rod extending in axial direction in the interior of said hollow shaft and abutting in said operative position on said other ends of said pawls means for pivoting the same about said pivot means.

4. A clutch as claimed in claim 1 wherein said annular inner toothing includes alternate teeth and recesses circumferentially spaced a pitch distance substantially equal to the combined thickness of all said adjacent coupling pawls of a group of coupling pawls.

5. A clutch as claimed in claim 4 wherein said teeth of said annular inner toothing are ratchet teeth having a steep front face and a sloping rear face; wherein each of said coupling pawls has slanted engagement faces parallel with said front and rear faces, respectively; and wherein one of said coupling pawls abuts said front face in said coupling position with the respective engagement face thereof.

6. A clutch as claimed in claim 1 wherein said springs are leaf springs abutting the outer ends of said coupling pawls, respectively, and being secured to said other part.

7. A clutch as claimed in claim 1 wherein said drive part has an outer worm gear ring; and comprising a driving worm screw meshing with said worm gear ring and having an axis perpendicular to said axis so that said drive part is rotated.

8. A clutch as claimed in claim 1 wherein said drive part surrounds said driven part; wherein said driven part includes a hollow shaft carrying said holder means with said coupling pawls, and rotatably supporting said drive part; and wherein said actuating means include an actuating rod in the interior of said hollow shaft cooperating with said coupling pawls for turning the same about said pivot means against the action of said springs.

9. A clutch as claimed in claim 8 wherein said holder means include a set of radially projecting holder means angularly spaced about said axis, each holder means of said set including a pivot; wherein said coupling pawl means include a set of radially extending coupling pawl means mounted on each said pivots, respectively, for angular movement, each coupling pawl means including a group of adjacent coupling pawls; wherein said coupling pawls are double-armed levers mounted on said pivots and having outer end portions radially projecting toward said annular inner toothing, and inner end portions projecting into the interior of said hollow shaft through openings formed in said hollow shaft so that said inner end portions are engaged and operated by said actuating rod.

* * * * *